(12) United States Patent
Bowers et al.

(10) Patent No.: US 8,757,952 B2
(45) Date of Patent: *Jun. 24, 2014

(54) FASTENER FOR SECURING TOGETHER TWO PANELS

(71) Applicant: Ned C. Bowers, Mount Dora, FL (US)

(72) Inventors: Ned C. Bowers, Mount Dora, FL (US); Carlos Osorio, Apopka, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/630,324

(22) Filed: Sep. 28, 2012

(65) Prior Publication Data

US 2014/0093327 A1    Apr. 3, 2014

Related U.S. Application Data

(60) Division of application No. 13/176,116, filed on Jul. 5, 2011, now Pat. No. 8,282,329, which is a continuation of application No. 12/581,313, filed on Oct. 19, 2009, now Pat. No. 7,997,843.

(51) Int. Cl.
   *F16B 21/00* (2006.01)
(52) U.S. Cl.
   USPC ............................. 411/551; 411/903; 24/663
(58) Field of Classification Search
   USPC ................ 411/315–317, 353, 546, 549–555, 411/902–903; 24/455, 457–458, 470–473, 24/663
   See application file for complete search history.

(56) References Cited

U.S. PATENT DOCUMENTS

| | | |
|---|---|---|
| 2,486,411 A | 11/1949 | Huelser |
| 2,486,670 A | 11/1949 | Gilbert et al. |
| 2,858,156 A | 10/1958 | Wootton |
| 2,922,211 A | 1/1960 | Boyd |
| 2,975,667 A | 3/1961 | Bross |
| 3,488,815 A | 1/1970 | Metz |
| 3,630,261 A | 12/1971 | Gley |
| 3,675,280 A | 7/1972 | Winslade |
| 3,827,110 A | 8/1974 | Dzus et al. |
| 4,227,287 A | 10/1980 | Gunther |
| 5,688,093 A | 11/1997 | Bowers |
| 5,690,460 A | 11/1997 | Attanasio |
| 5,716,180 A | 2/1998 | Bowers |
| 5,795,122 A | 8/1998 | Bowers |
| 6,261,042 B1 | 7/2001 | Pratt |
| 6,287,043 B1 | 9/2001 | Kraus |
| 6,776,566 B2 | 8/2004 | Kobusch et al. |
| 6,789,993 B2 | 9/2004 | Ozawa et al. |
| 6,860,689 B1 | 3/2005 | Attanasio |
| 7,462,008 B2 | 12/2008 | Attanasio |
| 2006/0193714 A1 | 8/2006 | Werner |
| 2006/0263172 A1 | 11/2006 | Bassani et al. |
| 2007/0122254 A1 | 5/2007 | LaConte et al. |

*Primary Examiner* — Roberta Delisle

(74) *Attorney, Agent, or Firm* — Robert L. Wolter, Esq.; Beusse Wolter Sanks Mora & Maire, P.A.

(57) ABSTRACT

A fastener comprises an adjustable insert that disposed in a receptacle having a first end facing a grommet and the insert is connected to the receptacle for movement relative to the receptacle. The insert has a central opening and diametrically opposed cam and locking surfaces open to said central opening. A bore in the insert is radially disposed relative to a longitudinal axis of the insert. An engagement member disposed within the bore is moveable therein laterally relative to the longitudinal axis of the insert toward and against the receptacle to fix the insert against movement relative to the receptacle. The engagement member is moveable laterally relative to and toward the central opening of the insert to allow movement of the insert relative to the receptacle.

25 Claims, 13 Drawing Sheets

FASTENER FOR SECURING TOGETHER TWO PANELS

CROSS-REFERENCE TO RELATED APPLICATIONS

This application claims priority to and is a Divisional of U.S. application Ser. No. 13/176,116 filed Jul. 5, 2011, which is a Continuation of Ser. No. 12/581,313 filed Oct. 19, 2009, now U.S. Pat. No. 7,997,843 issued Aug. 16, 2011, and incorporated herein by reference in its entirety.

BACKGROUND OF THE INVENTION

The present invention relates to quick connect fasteners for holding panels together and, more particularly, to ¼ turn fasteners which can be fastened and unfastened quickly and repeatedly.

As can be seen from Prior Art FIG. 1, fasteners 10 of the ¼ turn type have been known which include a grommet 12, a stud 14 and a receptacle 16. The fastener 10 holds together two panels 18 and 20, with adjacent sides of the panels in contact with one another, by extending through openings 22 and 24 foamed in the panels to receive the fastener. The grommet 12 has a cylindrical body 26 sized to extend through the opening 22 in one of the panels 18, usually an outer panel, and one end of the cylindrical body 26 has a radially outward extending flange 28 to engage the outer surface of the outer panel 18. The stud 14 has a shaft 30, a head 32, a cross pin 34 extending through the shaft at an end opposite to the head, a cup member 36 slidable along the shaft and a spring on the shaft between the head and cup member and received in the cup member. The stud 14 is received in the grommet 12, with the head 32 of the stud being adjacent to the flange 28 on the grommet and a radially outward extending flange 38 on the cup member 36 engaging a radially inward extending flange 40 at the end of the grommet 12 opposite to the radially outward extending flange 28. This arrangement keeps the head 32 of the stud 14 biased by the spring slightly outward from the radially outward extending flange 28 at the outer side of the outer panel 18. The cross pin 34 on the stud 14 prevents the assembly of the grommet 12 and the stud 14 from separating from the outer panel 18. Due to the presence of the cross pin 34 and the stiffness of the spring, a tool is required to move the cup member 36 adjacent to the head 32 by compressing the spring and thereby providing sufficient distance between the cross pin and the cup member that the stud can be inserted, at an angle, into the grommet. However, the geometry of this arrangement limits the axial length of the grommets 12 which can be used. Specifically, when the axial length of a grommet 12 reaches a certain magnitude, the stud 14 cannot be inserted into the grommet even when the cup member 36 is adjacent to the head 32.

The receptacle 16 of the fastener 10 has a generally cylindrical body 42 and a flange 44 projecting radially outward from one end of the body. The receptacle body 42 defines a central opening and has cam and locking surfaces 46 defined at an end opposite the radially outward extending receptacle flange 44. The receptacle flange 44 is placed against and secured to a side of the other panel 20, usually an inner panel, opposite to the side contacting the first panel 18, with the receptacle body 42 extending away from the side of the panel 20 to which the flange is attached. The panels 18 and 20 are brought together so that the stud 14 and the receptacle 16 are in alignment. The head 32 of the stud 14 is engaged by a turning tool, such as a screwdriver, pushed inwardly against the bias of the spring, and turned ¼ turn with the cross pin 34 of the 30 in engagement with the cam and locking surfaces 46 of the receptacle 16. This action locks the fastener 10 in place with the two panels 18 and 20 in secure engagement with one another.

A drawback of such a fastener is that, for a stud of any particular length, the total thickness of the two panels for which the fastener is effective must lie within a very limited range, typically a range of 0.030 inches. If the total thickness lies outside the range, a longer or shorter stud 14 must be used. If the total thickness lies outside the range by more than a full width of the range, a stud 14 two sizes longer than the first size must be used. Accordingly, for most work, a variety of stud sizes must be purchased and kept on hand.

The outer diameter of the cylindrical body of the grommet is sized to engage the surface defining the opening through the outer panel, so that lateral shifting of the outer panel with respect to the fastener is prevented. As the thickness of the outer panel increases, the length of grommet required increases. However, longer grommets have also required longer studs to enable the cross pin of the stud to pass through the longer grommets, at an angle.

U.S. Pat. No. 5,716,180 (the "'180 patent"), and U.S. Pat. No. 5,795,122 (the "'122 patent"), which are incorporated herein by reference, each disclose fasteners that are adjustable to accommodate varying thicknesses of panels or different lengths of studs. Both the '180 patent and '122 patent disclose a fastener that includes an insert or "insert member" that is moveable relative to a receptacle mounted to one of the two elements that are fastened together. The insert has diametrically opposed cam and locking surfaces for receiving the above referenced stud and cross-pin. In addition, the insert has external threads that are sized to engage internal threads for rotating the insert and moving it relative to the receptacle thereby adjusting the distance between the grommet and locking surfaces. This may be advantageous if thickness of the panels vary.

The fasteners in the '180 patent and '122 patent also include a locking mechanism that fixes the insert against movement relative to the receptacle. The '180 patent discloses a compressible spring roll pin inserted into a slot formed by a groove on the outer periphery of the insert that is aligned with a groove on in internal surface of the receptacle. A second embodiment disclosed in the '180 patent refers to using a resilient member such as a nylon strip that is disposed in the grooves of the insert and receptacle. As disclosed the resilient member may take the form of an elongated member inserted in a groove formed on the external surface and threads of the barrel or insert member; or, the resilient member may take the faun of a pellet inserted into a radial bore formed in the insert.

With respect to the '122 patent, there is disclosed a locking clip on an external surface of the receptacle. The locking clip is generally shaped like a "G" and made of a resilient material such as spring steel. The laterally disposed lip or locking member fits through a slot the receptacle and into a groove on the insert locking the insert against movement relative to the receptacle. While both fasteners provide advantages of an adjustable fastener, there are some disadvantages. One such disadvantage, at least with respect to the compression spring and locking pin, is that in order to access the locking mechanism for these fasteners one of the panels must be removed. In some cases, several or multiple fasteners may be in place and must be disengaged in order to remove the panel, which can be time consuming. Accordingly, a need exists for an adjustable fastener that has a locking mechanism that can be accessed without the need of removing panels during installation of the same.

BRIEF DESCRIPTION OF THE INVENTION

By the present invention, the drawbacks of the known fasteners have been overcome, and a wide range of panel thicknesses can be accommodated by a ¼ turn fastener in which each component is of a single size.

In order to accomplish this feature of the present invention, the receptacle is adjustable. More particularly, the receptacle includes an internally threaded body and an externally threaded insert, wherein the threads of the body and the insert are in engagement with one another so that rotation of the insert relative to the body moves the insert axially with respect to the body. Cam and locking surfaces for the cross pin of the stud are defined in the insert. As a result, the position of the insert within the receptacle body can be adjusted so that a single length stud can be used, and yet total panel thickness can be varied over a wide range. Where total panel thickness is relatively thin, the insert can be rotated so that the cam and locking surfaces are relatively far from the receptacle side of the second panel. Where the total panel thickness is relatively thick, the insert can be turned to attain a position in which the cam and locking surfaces are relatively close to the two panels. In either case, the cross pin of a stud of just one length engages the cam and locking surfaces of the insert.

In an embodiment, in order to positively lock the insert with respect to the cylindrical body of the receptacle, when the desired position of the insert has been set, an engagement member is moveable in a radially disposed bore having an opening facing an inner surface or the internal threads of the receptacle. A biasing mechanism biases the engagement member toward and against the receptacle locking the insert in place. The receptacle may include two diametrically opposed semi-cylindrical grooves the inner annular surface of the cylindrical body of the receptacle for receiving the engagement member.

In an aspect of an embodiment of the invention, the above-referenced biasing mechanism may include a pin disposed within a slot wherein the pin and slot having a longitudinal axis parallel to the longitudinal axis of the insert and receptacle. The slot has a first opening at the end of the insert facing the grommet and a second opening at the opposite end of the insert. A biasing mechanism is positioned at the second opening of the slot and biases the pin toward the grommet, and the pin contacts the engagement member biasing it laterally toward and against the receptacle. In order to rotate the insert, a tool may be provided that has a cross pin that is received by the cam and locking surfaces of the insert. In addition, the tool engages the end of the pin facing the grommet moving the pin toward the second end of the insert. The pin has a section with a lesser diameter that allows the engagement member to move laterally toward the central opening of the insert and off the receptacle. In this manner the insert may be rotated and moved relative to the receptacle.

In another aspect of an embodiment of the invention the pin is rotatable within the slot to move the pin and engagement in and out of locking engagement with the receptacle body.

With respect to another embodiment of the invention, the fastener may hold together first and second panels in spaced relation, wherein each panel has an aperture for receiving the fastener, a first side of each panel in facing each other, and a second side facing away from the other side of said panels. The fastener comprises a grommet having an opening and a radially outward extending flange for engaging the second side of said first panel. In addition, a first receptacle is mounted to the first side of the second panel and has a central opening facing the first side of the first panel and the central opening is aligned with the aperture of the first panel. A collar mount is fixed within the first receptacle for receiving and for mounting therein a plurality of second receptacles each second receptacle having a different configuration than the other second receptacles, and each second receptacle having cam and locking surfaces for engaging cross pins of a stud having been inserted through the grommet.

With respect to another aspect of the invention the first receptacle is mounted to a flange that includes two or more apertures that aligned with apertures on the panel and bolts are inserted through the apertures on the flange and panel and secured with a nut. The fastener may include a cam washer having a first disc and a second disc wherein the first disc has a diameter that is larger than a diameter of the second disc, and the first and second disc are concentrically aligned. In addition, a hole extends through the first disc and second disc through which a bolt is inserted. The hole in the washer has a first curved edge that is concentrically aligned with the first and second discs and a second curved edge is not concentrically aligned and disposed toward a periphery of the first and second discs. The second disc is seated in an aperture on the fastener flange and has a diameter that is smaller than the diameter of the aperture on the fastener flange so that when the bolt is positioned off the first edge of the hole toward or against the second edge of the hole the washer is rotatable to move the fastener on the second panel and to align the central opening of the first receptacle with an aperture of the first panel.

DETAILED DESCRIPTION OF THE INVENTION

Figure 1:
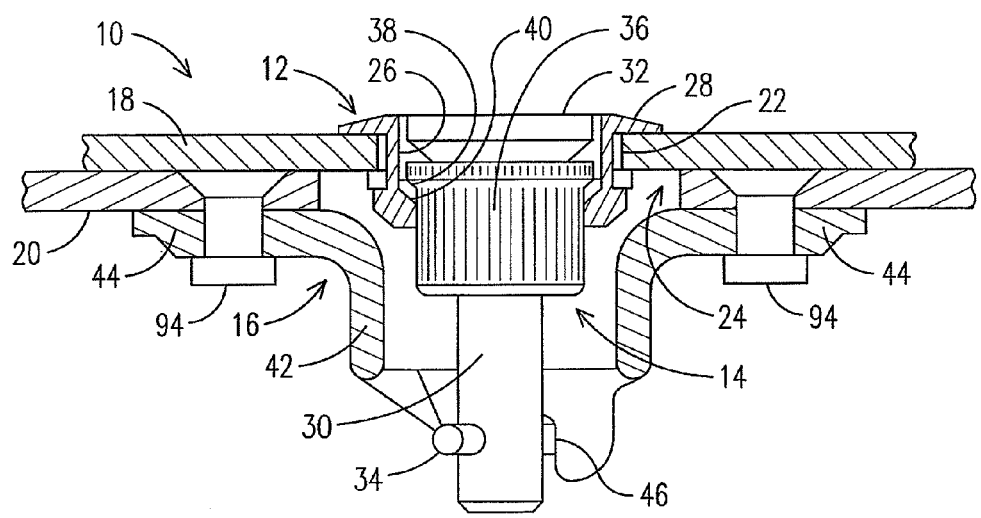
FIG. 1 is a cross section of a prior art fastener holding two panels together.
Figure 2:
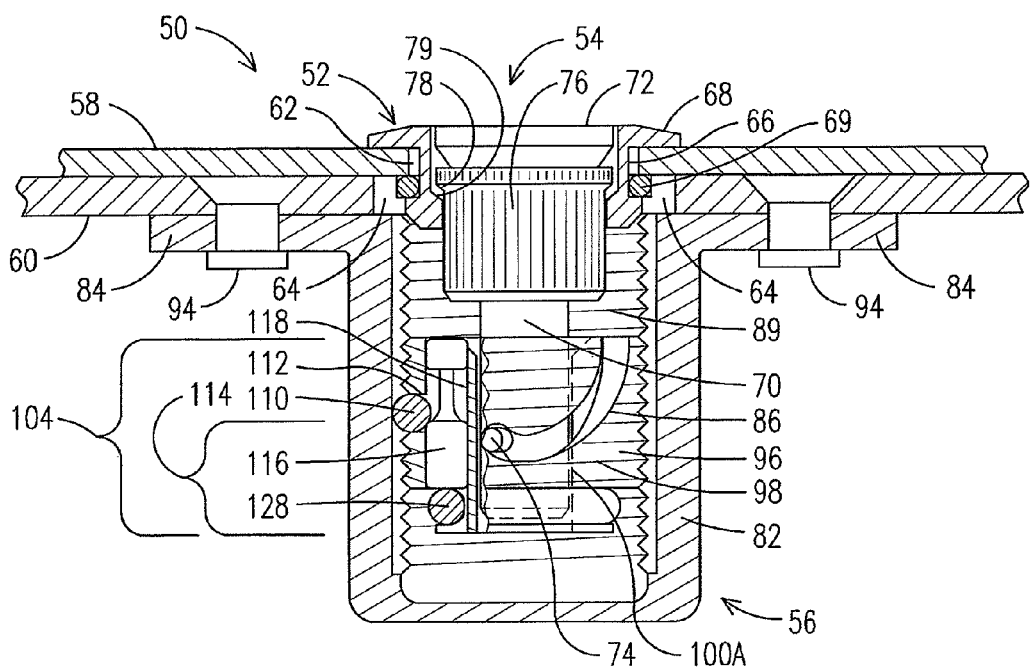
FIG. 2 is a cross section of the fastener according to the present invention holding two panels together.

As can be seen from FIG. 2, the adjustable fastener according to the present invention, which is designated generally by the reference numeral 50, is of the ¼ turn type, having a grommet 52, a stud 54, and a receptacle 56. The fastener 50 holds together two panels 58 and 60, with adjacent sides of the panels in contact with one another, by extending through openings 62 and 64 formed in the panels to receive the fastener 50. The grommet 52 has a cylindrical body 66 sized to extend through the opening 62 in one of the panels 58, usually an outer panel, and one end of the cylindrical body 66 as a radially outward extending flange 68 to engage the outer surface of the outer panel 58. The other end of the cylindrical body 66 has a radially outwardly extending shoulder or flange to engage a retaining ring 69 for retaining the grommet 52 on the outer panel 58. The stud 54 has a shaft 70, a head 72, a cross pin 74 extending through the shaft 70 at an end opposite to the head, a cup member 76 slidable along the shaft and a spring on the shaft between the head and cup member and received in the cup member. The stud 54 is received in the grommet 52 with the head 72 of the stud 54 being adjacent to the flange 68 on the grommet and a radially outward extending flange 78 on the cup member 76 engaging a radially inward extending flange 79 at the end of the grommet 52 opposite to the radially outward extending flange 68. This arrangement keeps the head 72 of the stud 54 biased by the spring (not shown) slightly outward from the radially outward extending flange 68 at the outer side of the outer panel 58. The cross pin 74 on the stud 54 prevents the assembly of the grommet 52 and the stud 54 from separating from the outer panel 18. Due to the presence of the cross pin 74 and the stiffness of the spring, a tool is required to move-the cup member 76 adjacent to the head 72 by compressing the spring and hereby providing sufficient distance between the cross pin and the cup member so that the stud 54 can be inserted, at an angle, into the grommet 52. However, the geometry of this arrangement limits the axial length of the grommets 52 which can be used. Specifically, when the axial length of a grommet 52 reaches a certain axial length, the stud 54 cannot be inserted into the grommet even when the cup member 76 is adjacent to the head 32.

The receptacle 56 of the fastener 50 has a generally cylindrical body 82 and a flange 84 projecting radially outward from one end of the body. The receptacle body 82 defines a central opening and has cam and locking surfaces 86 defined at an end opposite the radially outward extending receptacle flange 84. The receptacle flange 84 is placed against and secured to a side of the other panel 60, usually an inner panel, opposite to the side contacting the first panel 58, with the receptacle body 82 extending away from the side of the panel 60 to which the flange is attached. The panels 58 and 60 are brought together so that the stud 54 and the receptacle 56 are in alignment. The head 72 of the stud 54 is engaged by a turning tool, such as a screwdriver, pushed inwardly against the bias of the spring, and turned ¼ turn with the cross pin 74 of the stud in engagement with the cam and locking surfaces 86 of the receptacle 56. This action locks the fastener 50 in place with the two panels 58 and 60 in secure engagement with one another.

Figure 3:
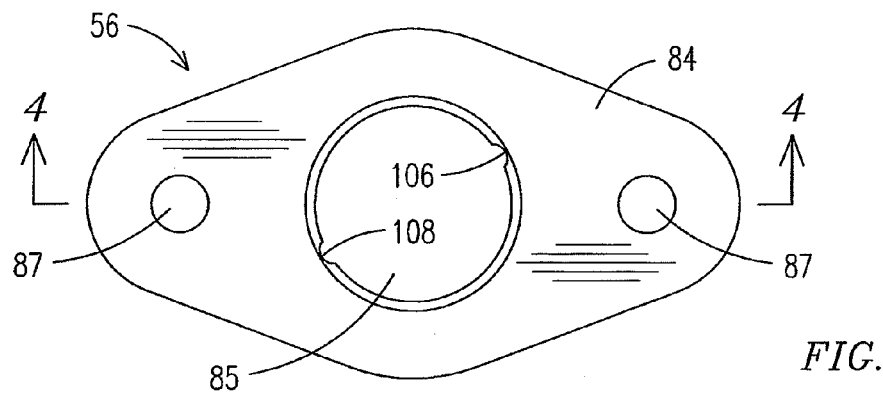
FIG. 3 is a top plan view of the receptacle of the fastener of FIG. 2.
Figure 4:
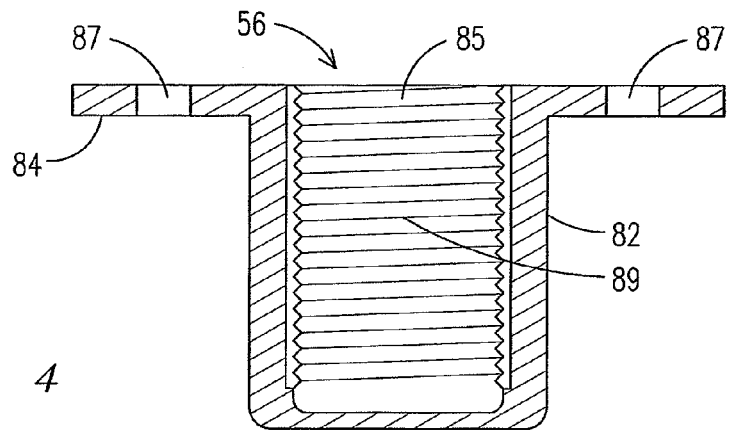
FIG. 4 is a sectional view of the receptacle of the fastener of FIG. 2 taken along line 4-4.

With respect to FIGS. 3 and 4, the receptacle body 82 defines a central opening 85 and has internal threads throughout its axial length. The receptacle flange 84 may be placed directly against and secured to a side of the other panel 60, usually an inner panel, opposite to the side contacting the first panel 58, with the receptacle body 82 extending away from the side of the panel 60 to which the flange 84 is attached. The flange 84 on the receptacle 56 includes apertures 87 through which rivets 94 are secured, as shown in more detail in FIG. 2. As explained in more detail below, internal threads 89 on the receptacle body allow for movement of an adjustable insert positioned in the receptacle 56.

Figure 5:
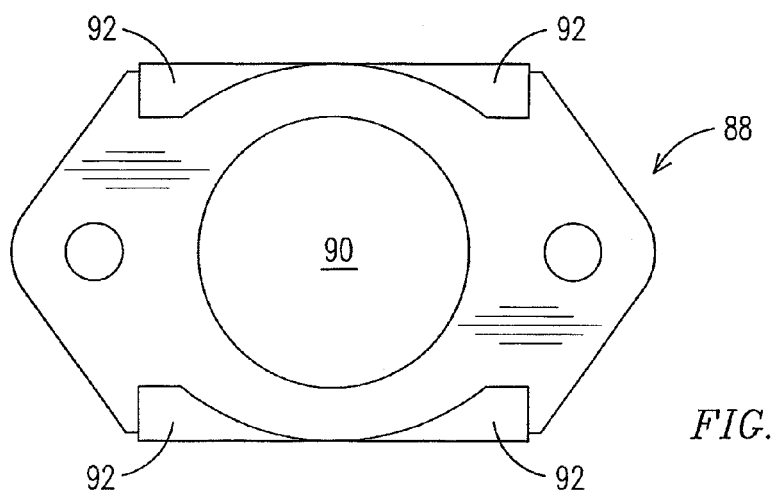
FIG. 5 is an optional cage mount for mounting the receptacle of FIG. 6 to a panel.
Figure 6:
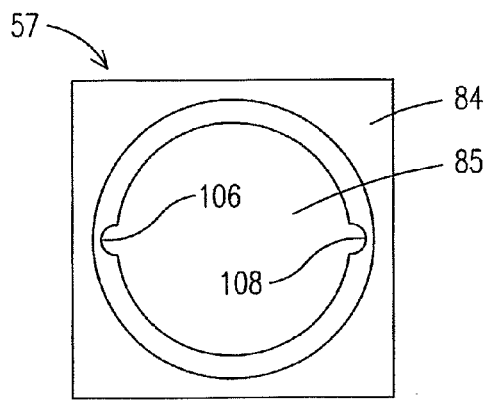
FIG. 6 is a top plan view of a second embodiment of the receptacle.
Figure 7:
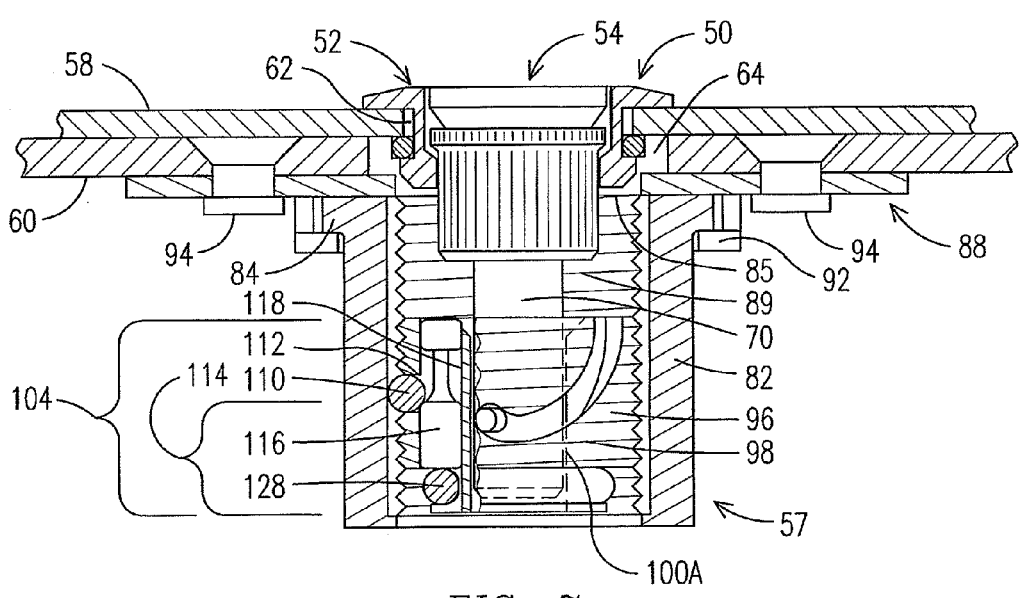
FIG. 7 is a sectional view of a fastener incorporating the cage mount.

As can be appreciated from FIGS. 5, 6 and 7, in an embodiment the flange 84 is attached by being retained in a cage 88 having an opening 90 smaller than the outer perimeter of the flange 84 and having ears 92 for holding the receptacle 57. The cage 88 is mounted to the panel 60, such as by rivets 94, and the ears 92 holding the receptacle provide some play to move the for proper alignment with the grommet 52. During the assembly of the fastener 50, the cage 88 is a generally flat stamped piece of metal including the ears 92, and the flange 84 is placed against a surface of the cage 88 with the central opening 85 of the receptacle 57 aligned with opening 90 on the cage 88. The cage 88 is then subject to a metal press to fold the ears 92 over and against the flange 84. This particular embodiment shown in FIG. 6, allows for movement of the receptacle 57 relative to the cage 88 and the panels 58 and 60, so the receptacle 56 can be aligned with the grommet if the openings 62 and 64 on panels are not effectively aligned. While there is an embodiment of the cage mount shown and described herein, variations of the embodiment may be apparent to one skilled in the art.

In either of the above-described embodiments and in other embodiments disclosed herein, the receptacle 56 or 57 further includes a cylindrical insert member 96 having external threads 98, the insert member 96 being sized so that the threads 98 engage the internal threads 89 on the inner surface of the receptacle body 82 in normal threaded engagement. As can be seen from FIGS. 2 and 7-10, the insert member 96 also has a central opening 100 large enough to receive the shaft 70 of the stud 54. Diametrically opposed curved slots 102 each have an open end extending through a first end 96A of the insert member 96 facing the grommet 52, and a closed end disposed toward a second end 96B of the insert member 96. The curved slots 102 define the cam and locking surfaces 86, more specifically, cam surfaces leading to apices beyond which the slots 102 curve back toward the end 96A of the insert member 96 facing the grommet 52 to define locking surfaces for the cross pin 74 of the stud 54. The length of the cross pin 74 is greater than the inner diameter of the insert member 96 (or diameter of the central opening 100 of the member 96) but less than the central opening 85 of the receptacle body 82.

Figure 13A:
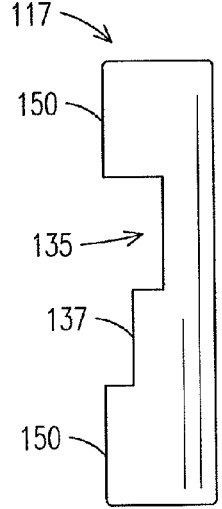
FIG. 13A is a side elevational of a second embodiment of the pin of the locking mechanism.
Figure 12:
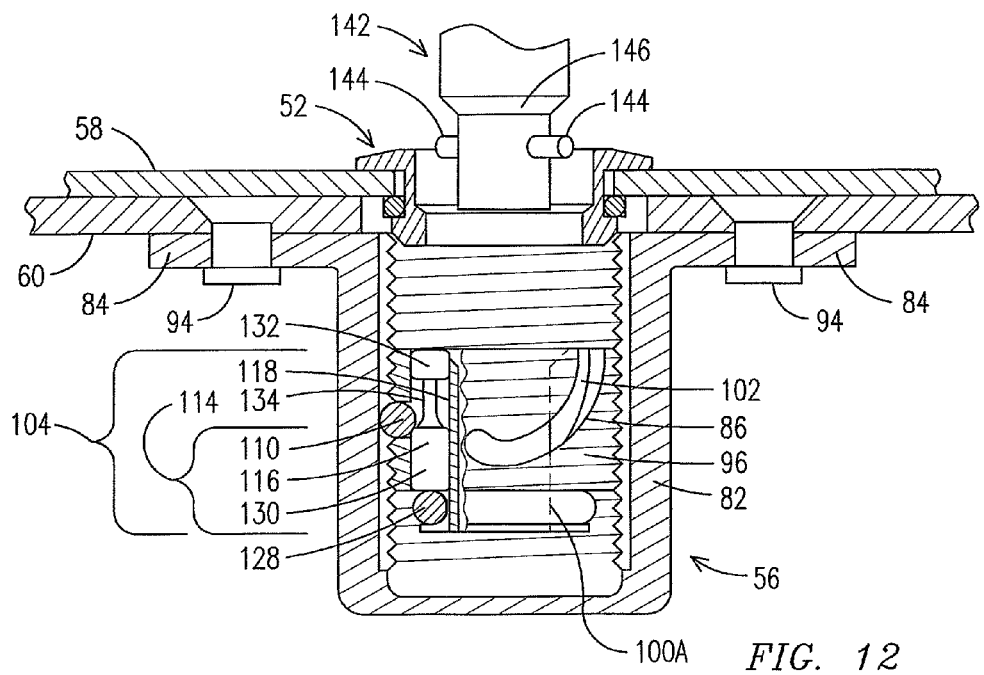
FIG. 12 is a sectional view of the fastener of FIG. 2 with the tool being positioned for adjusting the position of the insert in the receptacle.
Figure 13:
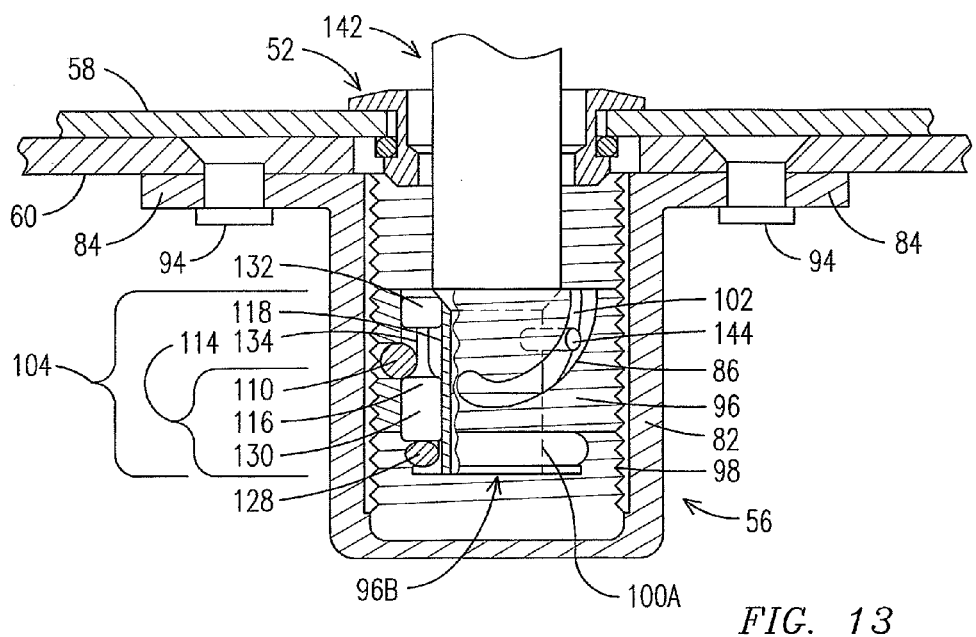
FIG. 13 is a sectional view of the fastener of FIG. 2 with the tool engaging a locking mechanism of the fastener for adjusting the position of the insert in the receptacle.

As shown in FIGS. 2, 12 and 13 a locking mechanism 104 is provided to prevent rotation of the insert member 96 relative to the cylindrical body 82 of the receptacle 56 after the insert 96 has been set in a desired position. The locking mechanism 104 includes two diametrically opposed, parallel and semicircular grooves 106 and 108 (see, FIGS. 3 and 6) formed along an inner surface of the receptacle body 82. The grooves 106 and 108 are disposed parallel to a longitudinal axis of the receptacle body 82. In addition, the locking mechanism 104 includes an engagement member 110, such as a ball bearing, that is positioned within a radially disposed boring 112 formed in the insert 96. The boring 112 is orthogonally or radially disposed relative to the longitudinal axis of the receptacle body 82 and the insert 96, so the engagement member 110 may move in and out of engagement with the receptacle body 82 at the grooves 106 or 108. A biasing mechanism is provided to bias the engagement member 110 against the receptacle body 82. The biasing mechanism 114 includes a pin 116 positioned within a slot 118 formed in insert 96, which is disposed parallel to a longitudinal axis of the receptacle body 82 and the insert 96. The slot 118 is in communication with the boring 112 so the pin 116 may contact the engagement member 110. As explained in more detail below a resilient member 128, which may be characterized as a component of the biasing mechanism, biases the pin 116 toward the grommet 52 and the pin 116 in turn biases the engagement member 110 against the receptacle 56.

Figure 8:
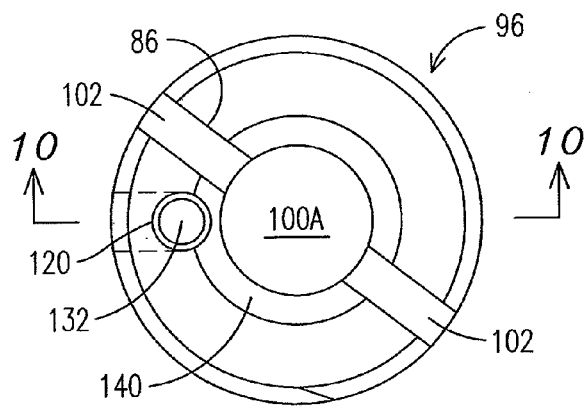
FIG. 8 is a top plan view of the insert of the fastener of FIG. 2.
Figure 9:
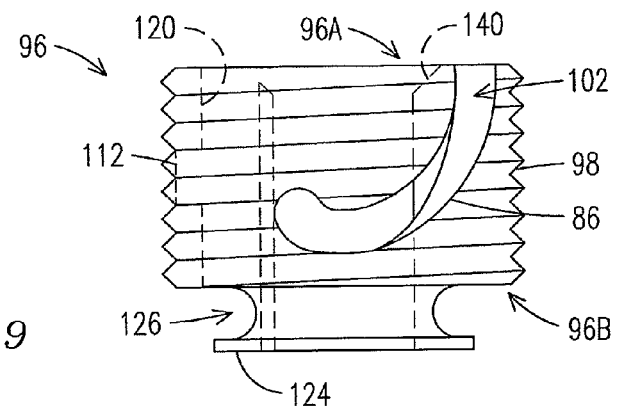
FIG. 9 is an elevational view of the insert in FIG. 8.
Figure 10:
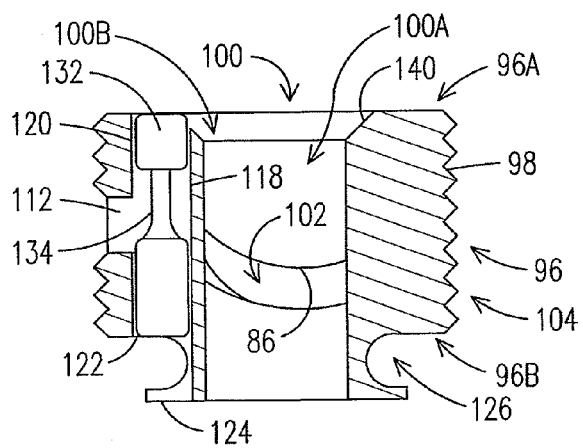
FIG. 10 is a sectional view of the insert in FIG. 8 taken along line 10-10.

As shown in FIGS. 8, 9, and 10, the slot 118 has a first opening 120 at the first end 96A of the insert 96 facing the grommet 52 and a second opening 122 at the second end 96B of the insert 96 facing away from the grommet. The insert 96 includes a flange 124 that is spaced from the second end 96B of the insert 96 forming a groove 126. A resilient member 128 such as an o-ring is positioned in the groove 126 biases the pin 116 toward the grommet 52. As illustrated in FIGS. 12 and 13, the pin 116 has at least two sections of differing diameters. In the embodiment disclosed herein, the pin 116 has a barbell-like configuration including two end sections 130 and 132 having the same diameter that is larger than the diameter of a mid-section 134 of the pin 116. In a locked position, the resilient member 128 contacts the end section 130 of the pin 116 biasing it toward the grommet 52 so the end section 130 of the pin 116 contacts the engagement member 110 biasing it toward the receptacle body 82. The boring 112 is aligned with the groove 106 or 108 so that a portion of the engagement member 110 seats within a groove 106 or 108 locking the insert 96 in a fixed position relative to the receptacle body 82.

With respect to FIG. 13A there is illustrated a second embodiment of the above described pin that is the component of the locking mechanism. The pin 117 shown in FIGS. 2, 12 and 13 includes the end sections 150 and the midsection 134 wherein the midsection has a diameter that is smaller than a diameter of the end sections 150 forming a notch or recess 135 for receiving the ball 110. An end 150 of the pin 117 disposed toward the biasing mechanism and includes a section 137 that has a diameter that is larger than the diameter of the pin 117 at the midsection 134 and smaller than the diameter the end section 150 forming the shoulder 137. The shoulder 137 engages the ball 110 when the resilient member 128 biases the pin toward the grommet 52 and first panel 58, thereby biasing the ball 110 toward the receptacle body 82.

Figure 10A:
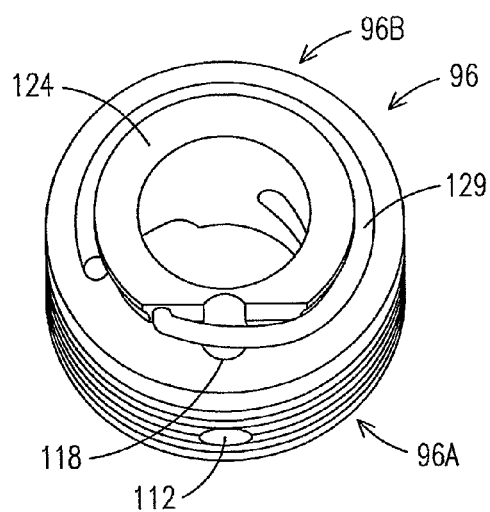
FIG. 10A is a bottom perspective view of the insert with a torsion spring.
Figure 10B:
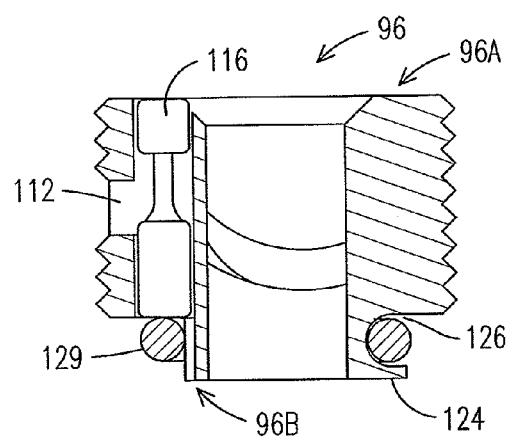
FIG. 10B is a side elevational view of the insert with the torsion spring.

An alternative embodiment is shown in FIGS. 10A and 10B and includes a torsion spring 129 instead of an o-ring as the resilient member. In this embodiment, a section of the flange 124 adjacent the slot 118 has been removed in order to seat the torsion spring in the groove 126, so the spring 129 may provide the biasing action at the slot 118 and against the pin 116 or 117. In this manner, the pin 116 or 117 moves longitudinally so the engagement member 110 moves in the bore 112 in and out of engagement with the receptacle body 82.

Again with respect to FIGS. 12 and 13, as well as FIG. 10, in order to rotate the insert 96 and move it relative to the receptacle 56 and receptacle body 82 the pin 116 is biased toward the second end 96B of the insert 96. In this manner, the mid-section 134 of the pin 116 having the smaller diameter is positioned adjacent to the engagement member 110 providing space within the boring for receiving the engagement member 110. Thus, when the insert 96 is rotated the engagement member 110 retracts into the boring 112 enabling one to adjust the position of the insert 96 relative to the receptacle body 82 and grommet 52.

As shown in FIGS. 8 and 9, the opening 120 of the slot 118 facing grommet is in communication with the central opening 100 of the insert 96 so that the end section 132 of the pin 116 is exposed and can be engaged to bias the pin 116 toward the second end of the insert 96. In an embodiment, shown in FIGS. 8-10, the central opening 100 includes a bore 100A and a counter-bore 100B that has a diameter larger than the first bore 100A providing a shoulder 140. At least a portion of the first opening of the slot 118 extends along the shoulder 140 thereby exposing some portion end section 132 of the 116. A tool 142 illustrated in FIG. 11, may be provided to adjust the position insert 96 relative to the grommet 52 and receptacle 56. The tool 142, similar to the stud 54 of the grommet 52, includes cross pins 144. The length of the cross pin 114 is greater than the inner diameter of the insert member 96 (or diameter of the central opening 100 of the member 96) but less than the central opening 85 of the receptacle body 82 and less than the inner diameter of the grommet flange 79. The cross pins 144 of tool 142 are insertable within the curved slots 102 in order to engage the cam and locking surfaces 86.

Figure 11:
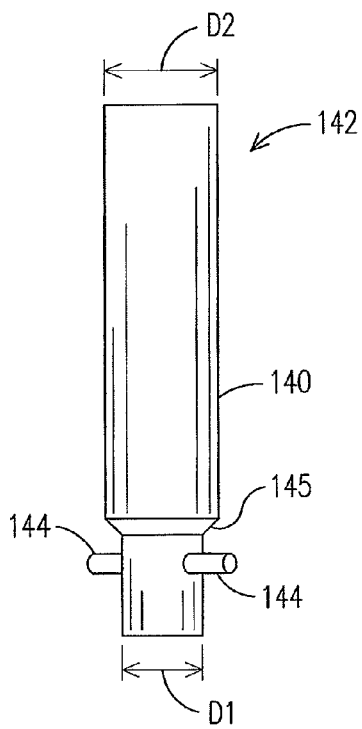
FIG. 11 is an elevational view of a tool used with present invention for the fastener.

As shown in FIGS. 11, 12 and 13, the tool 142 includes a tapered shoulder 146 that includes a first diameter D1 that is less than the diameter of the bore 100A of the insert member 96. The shoulder 140 tapers from the first diameter D1 to a larger diameter D2, which is spaced a sufficient distance from the cross pin 144 to enable the cross pin 144 to be inserted into slots 102. However, the cross pin 144 does not reach the closed ends of the slots 102, but instead engages surfaces of the upper end of the slots 102 so the tool 142 can rotate the insert 96 in either a clockwise or counterclockwise direction. In this manner, when the tool 142 is inserted through the panel 58 (not having been removed) and grommet 52 and into the receptacle 56 or 57 and insert member 96, the shoulder 145 contacts the end section 132 of the pin 116 pushing the pin 116 toward the second end 96B of the insert member 96. As described above, when the pin 116 is biased toward the second end 96B of the insert member 96, the engagement member 110 will move away from the receptacle body 82 toward the pin, thereby enabling one to rotate the insert member 96 in the receptacle 56 or 57 and adjust the position of the insert member 96 relative to grommet 52. In as much as the locking mechanism 110 is accessible at the central openings 100 and 85 of the receptacle 56 or 57 and insert member 96, the panels 58 and 60 do not have to be removed to move the insert 96 relative to the grommet 54 and receptacle 56 or 57. It is also noted that the cup 36 on the grommet 52, as shown in FIG. 2, has a diameter larger than the diameter of the counter-bore 100B, so the cup 36 will not depress the pin 116 when installed, so the insert 96 is not inadvertently unlocked from a fixed position relative to the receptacle.

Figure 14:
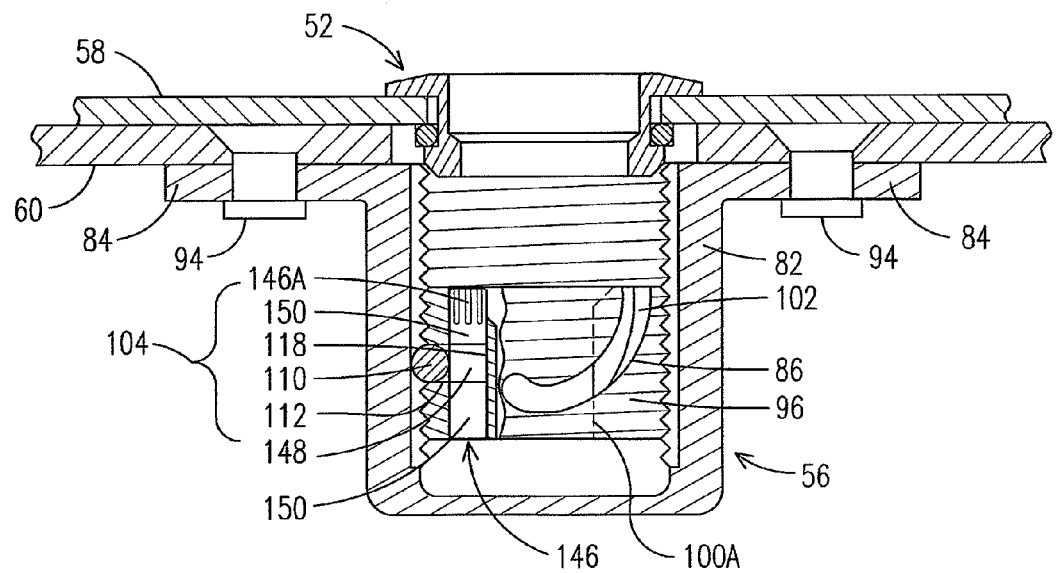
FIG. 14 is a sectional view of the fastener of FIG. 2 with another embodiment of the pin of the locking mechanism.
Figure 15:
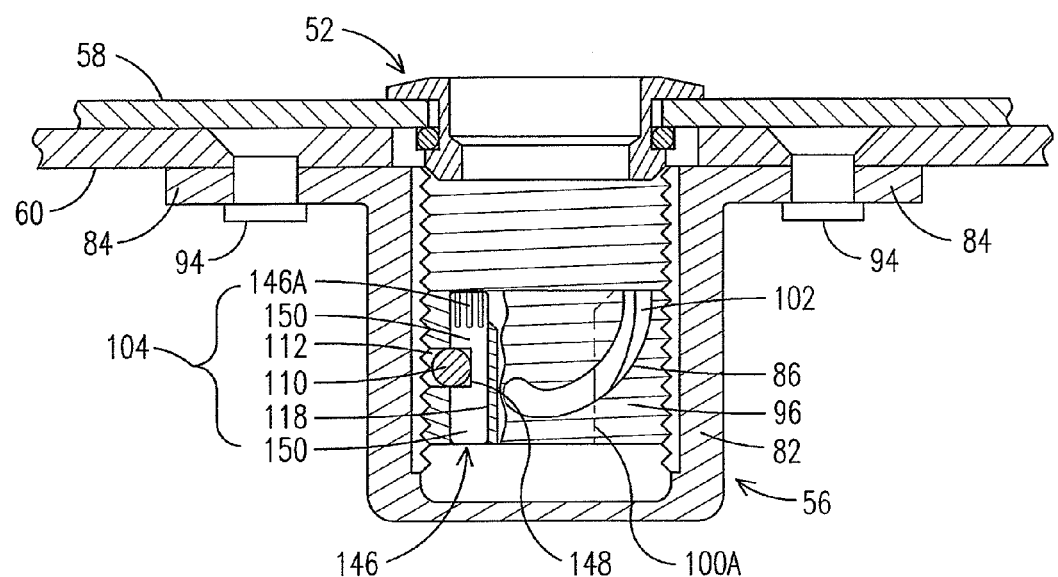
FIG. 15 is a sectional view of the fastener of FIG. 2, with the pin of FIG. 14 rotatable for operation of the locking mechanism.

In an embodiment shown in FIGS. 14 and 15, the pin 146 does not include the above-described "barbell" configuration; however, the pin 146 does include a recess 148 for receiving the engagement member 110 for unlocking the insert 96. As shown, the pin 146, includes at least two sections having differing diameters, including two end sections 150 having a diameter D1 that is greater than the diameter D2 of the recess 148. As shown, the locking mechanism 104 may be configured so the pin may be rotated in the slot 118 to move the recess 148 in and out of communication with the engagement member 110 and boring 112. As shown in FIG. 14, the pin 146 is oriented in the slot 118 so the recess 148 is not facing the boring 112. Accordingly, the pin 146 biases the engagement member toward and against the receptacle 56 at the groove 106 or 108, thereby locking the insert 96 in a fixed position relative to the receptacle 56.

In order to unlock the insert 96, the pin is simply rotated in the slot 118 in either a clockwise or counterclockwise direction, as shown in FIG. 15, so the recess 148, or a portion of the recess 148, faces the boring 112. In this manner, the engagement member 110 may move toward the pin 146 disengaging from the receptacle and unlocking the insert 96 to move the insert 96 relative to the receptacle 56. To prevent longitudinal movement of the pin 146 in the slot 118, a groove (not shown) may be machined around the pin 146 at the notch or recess 148, the engagement member may partially seat in the groove during adjustment. Similar to the above-described locking mechanism 104, including the pin 116, the slot 118 and pin 146 of this embodiment pin 146 disposed adjacent the central opening 100 of the insert 96 so one may adjust the insert without removing panels 58 or 60. An end 146A of the pin 146 may be adapted to receive a tool in order to rotate the pin 146.

Figure 16:
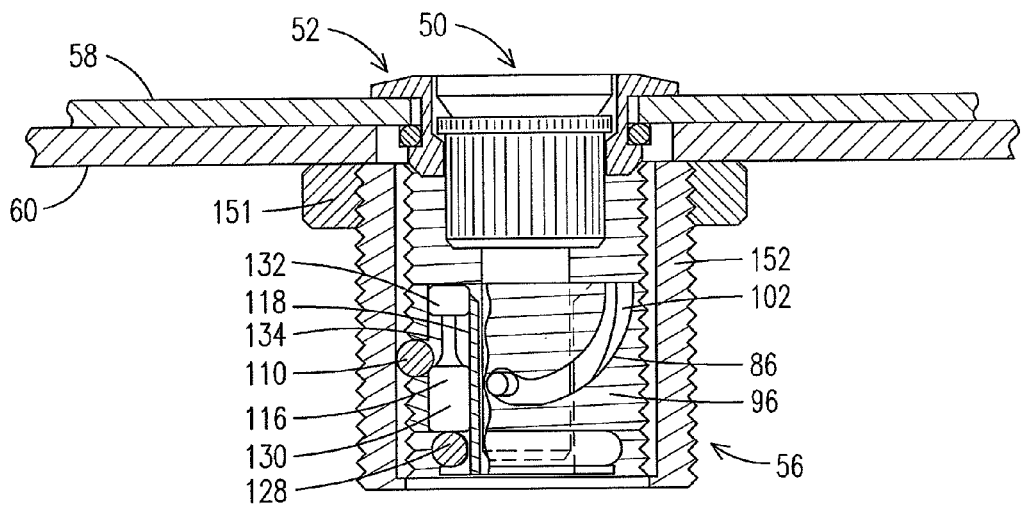
FIG. 16 is a sectional view of an embodiment of the invention in which a backing nut is used to secure the receptacle to a panel.

With respect to FIG. 16 an embodiment of the fastener 50 is shown in which the receptacle is secured to the panel 60 with a backing nut 151. The receptacle 56 (or receptacle 57) includes external threads 152 that are configured for threaded engagement with threads on the backing nut 151. The fastener 50 may include the adjustable insert 96 and locking mechanism 104 in either of above-described embodiments.

Figure 17:
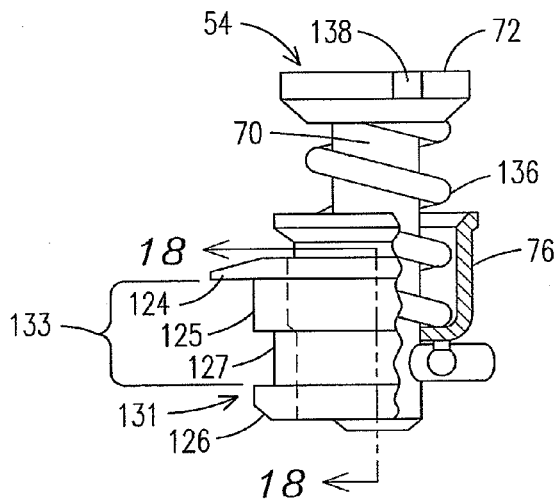
FIG. 17 is a front view of an assembly of a grommet according to the present invention with a stud, with the grommet removed from the right side of the drawing and a part associated with the stud shown in cross section.
Figure 18:
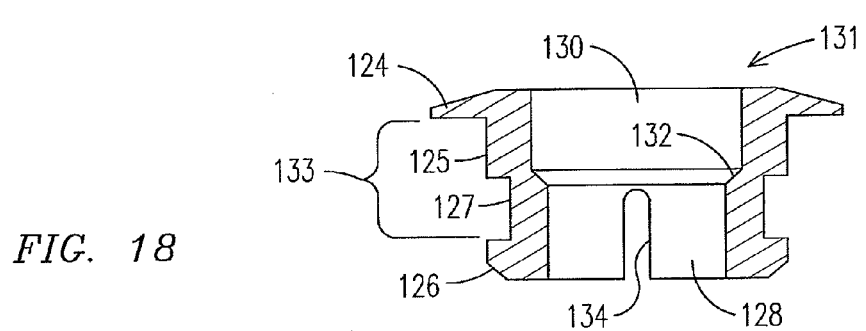
FIG. 18 is a cross section of an optional grommet according to the present invention taken along the line 18-18 in FIG. 17.

Fasteners employing the adjustable receptacle according to the present invention can be used with conventional grommets, as shown in FIGS. 2, 7, 12, 13, 14 and 15 or with grommets according to another aspect of the present invention. As can best be seen from FIGS. 17 and 18, the grommet 52 according to the present invention, which is designated generally by the reference numeral 131, has a generally cylindrical body 133, a larger flange 124 extending radially outward from a first body portion 125 at one end of the body 133, a smaller flange 126 directed radially outwardly from a second body portion 127 at the opposite end of the body, a smaller bore 128, and a counterbore 130 defining with the smaller bore a shoulder 132 facing the end of the body 125 having the larger flange 124. Diametrically opposed slots 134 are formed in the cylindrical body 133, extending from a closed end in the second body portion 127 adjacent to the shoulder 132 to an open end extending through the end of the grommet 131 distal to the larger flange 124. Each slot 134 has a width greater than the diameter of the cross pin 74 of the stud 54. As was described earlier, a spring 136 is positioned on the shaft 70 of the stud 54 and is visible in FIG. 17, where it is shown in its relaxed, or expanded, condition. The spring 136 is received in the cup member 76 and, thus, the spring 136 biases the cup member away from the head 72 of the stud 54. The cup member 76 engages the shoulder 132 defined between the smaller bore 128 and the counterbore 130 of the grommet 120. A slot 138 or other formation is defined in the head 72 of the stud 54 to receive a tool, such as a screw driver, for turning the head to engage or disengage the fastener.

A pliers must be used to insert the stud 54 into the grommet 131, and this is accomplished by forcing the cup 76 toward the head 72 of the stud against the bias of the spring 136 with the pliers, while holding the shaft 70 of the stud at an angle to the longitudinal axis of the grommet and inserting the stud into the bores 130 and 128 of the grommet. When the pliers is released, the grommet 131 is captured by the stud 54, since the length of the cross pin 74 of the stud is greater than the inner diameter of at least the smaller bore 128 of the grommet. Without moving the cup 76 toward the head 72 of the stud 54, the stud cannot be inserted in the grommet, even at an angle, because there is not enough distance between the cup 76 and the cross pin 74. It can be appreciated that, for a stud of a particular length, the stud cannot be inserted into a grommet even with the cup moved as close as possible to the head of the stud if the grommet exceeds a certain axial length. However, with the grommet 131 according to the present invention, the stud 54 need be inserted only until the cross pin 74 reaches the closed ends of the slots 134. Although the length of the cross pin 74 is greater than the inner diameter of at least the smaller bore 128 of the grommet body 133, the cross pin can be accommodated in the slots 134. With the slot structure, the axial length of the grommet 131 can be increased, and the stud 54 still inserted, while the distance from the closed end of the slot 134 to the end of the body 133 of the grommet 131 having the larger flange 124 is kept constant. The grommet according to the present invention can be used with the receptacle according to the present invention, and can also be used with conventional receptacles and conventional ¼ turn fasteners.

Figure 19:
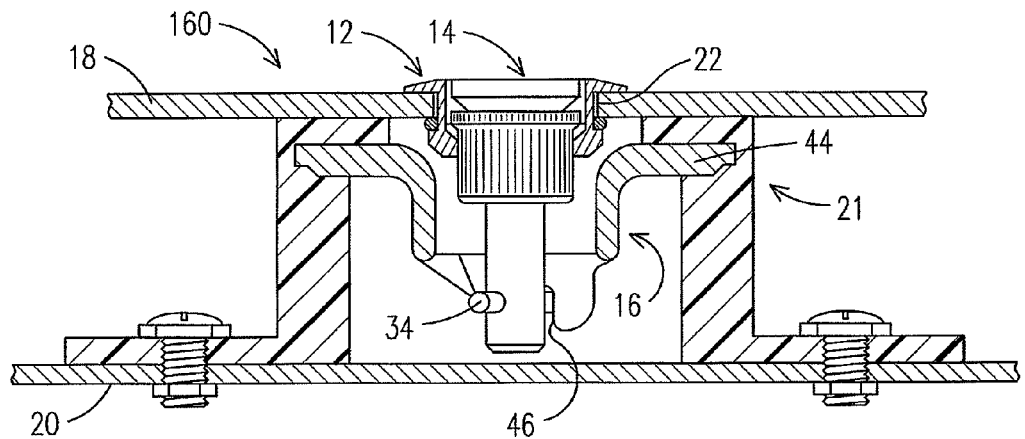
FIG. 19 is a sectional view of a prior art cowling fastener securing together two panels.
Figure 20:
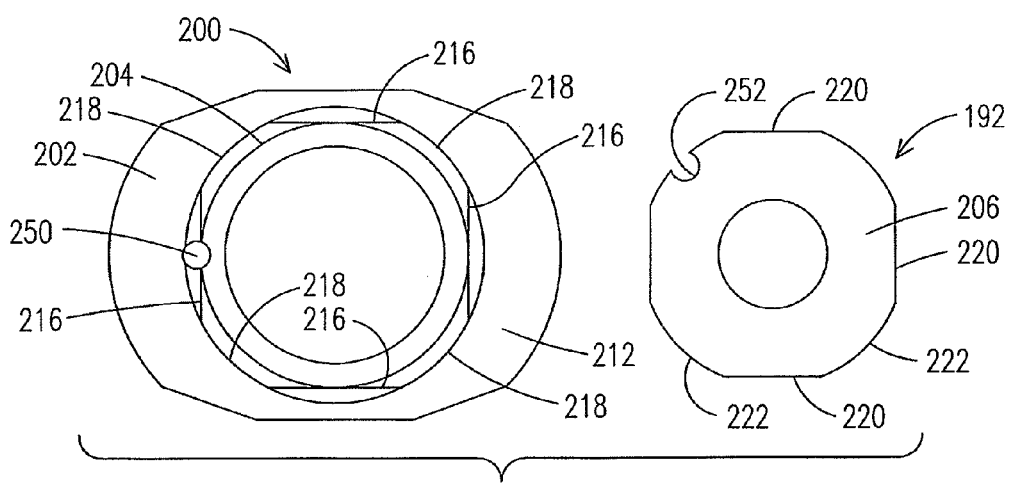
FIG. 20 is a top planar view of a collar mount and receptacle.
Figure 21:
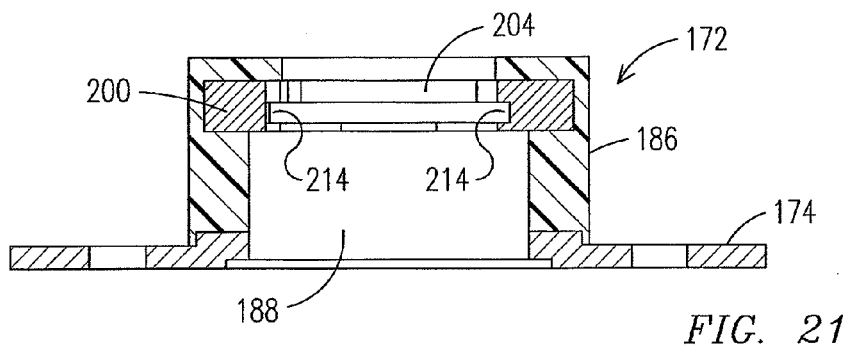
FIG. 21 is a sectional view of a synthetic rubber barrel mounted to a flange and a collar mount imbedded with the barrel.

With respect to FIG. 19, there is shown cowling fastener 160 of the prior art including the above-described grommet 12 and stud 14 together with a receptacle 16 for securing together panels 18 and 20. As shown, the cowling fastener 160 includes the grommet 12 seated in an opening 22 of the panel 18. The receptacle 16 includes a flange 44 embedded within a synthetic rubber barrel 21 which is in turn mounted to panel 20. The receptacle 16 is imbedded in the barrel 21 adjacent to panel 18 with the receptacle body 44 facing away from the panel 18 toward panel 20. The stud 14 is inserted through the grommet 12 and into receptacle 16 where the cross-pins 34 engage the cam and locking surfaces 46 securing the panels 18 and 20 together. Such a panel fastener is used in instances when panel may be spaced apart from another and require some level of movement relative to one another. However, in as much as the receptacle 16 is embedded within the barrel 21, the cowling fastener 160 is limited by the fact it is not adaptable to receive studs of varying configurations.

Figure 22:
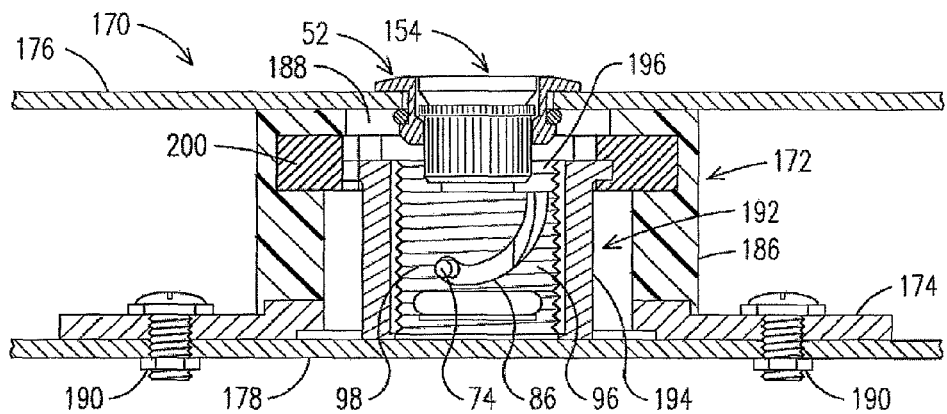
FIG. 22 is a sectional view of the collar mount and receptacle with an adjustable insert as components of a cowling fastener.

As shown in FIGS. 20, 21, 22 and 23 the cowling fastener 170 of the present invention is configured to interchangeably receive different receptacles to accommodate different grommets or studs to secure panels together. As shown in FIG. 22, the cowling fastener 170 may be used to secure together two panels 176 and 178. A grommet 52 is positioned in an opening in the first panel 176. A stud 154, having a cross pin 74, is inserted through the grommet 52 and positioned in locking engagement with the cowling fastener 170 securing the first panel 176 in spaced relation to the second panel 178. The fastener 170 includes a first receptacle 172 that may take the form of a synthetic rubber barrel mounted to a flange 174 and the barrel 172 includes a cylindrical body 186 including a central opening 188. A first end 172A of the barrel 172 abuts the first panel 176 and a second end 172B of the barrel 172 is affixed to the flange 174, which in turn is affixed to the second panel 178 by rivets or bolts 190.

A receptacle 192 is positioned within the barrel 172 and also includes a cylindrical body 194 having a central boring 196 that is coaxially aligned with the central opening 188 of the barrel 172. In an embodiment, the receptacle 192 may include the above described insert member 96 that has external threads 98 in threaded engagement with internal threads on the receptacle 192. The insert member 96 includes the cam and locking surfaces 86 for engaging and locking in place the stud 54. In addition, the insert 96 may include the above-described locking mechanism 104 (not shown in FIG. 22) to fix the insert 96 against movement relative to the receptacle 192. The locking mechanism 104 may be disengaged as described above for adjusting the position and moving the insert 96 relative to the receptacle 192.

As shown in FIGS. 20, 21, 22 and 23 the cowling fastener 170 includes a collar mount 200 imbedded in the barrel of the first receptacle 172 for receiving the receptacle 192. The collar mount 200 includes a flange 202 surrounding a recess or depression 204. The flange 202 of the collar mount 200 is imbedded in the barrel 172 toward the first end 172A of the barrel 172 with the depression 204 coaxially aligned with the central opening 188 of the barrel 172. The receptacle 192 includes a flange 206 that geometrically matches the depression 204 on the collar mount 200. The flange 206 on the receptacle 192 has a diameter that is smaller than the diameter of the central opening 188 of the barrel 172, so the receptacle 192 can be inserted into the barrel 172 with the flange 206 on the receptacle 192 facing the collar mount 200. The depression 204 on the collar mount 202 and flange 206 on the receptacle 200 are dimensioned so that the receptacle 192 is locked or crimped in fixed position relative to the barrel 172. With a receptacle 192 having been locked into position, the first panel 176 may be secured to the second panel 178 using the grommet 52 and stud 54. In such an embodiment, a kit may be provided that includes multiple receptacles.

Figure 23:
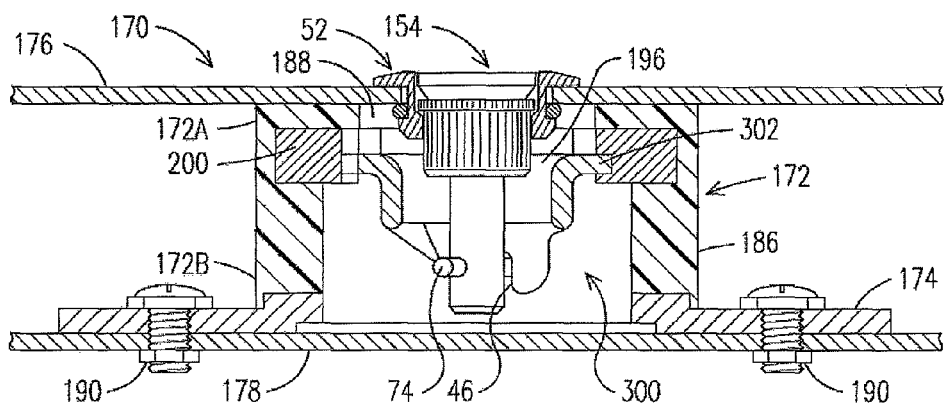
FIG. 23 is a sectional view of the collar mount and receptacle not having an adjustable insert.

While the above-described cowling fastener 170 of FIG. 22 includes the adjustable insert 96 with a locking mechanism 104, embodiments of the invention may include other types of adjustable inserts or receptacles do not require an adjustable insert. As shown in FIG. 23, the receptacle 300 is similar is some respect to prior art receptacles that do not include an adjustable insert. As shown, the receptacle 300 includes a flange 302 that is positioned relative to the collar mount 200 for locking the receptacle 300 in place relative to the collar mount 200 and barrel 172. As shown the receptacle 300 includes the cam and locking surface 46 of the prior art receptacles for securing the stud 14 in the receptacle 300 and grommet 12.

The attachment of the receptacle 192 is now described in more detail in reference to FIGS. 20, 22, 24A and 24B. As shown in an embodiment the collar mount 200 a recess is formed below a surface 212 of the collar mount 200. The recess extends circumferentially within the depression forming a lip 214 below the surface 212 of the collar mount 200 and within which the flange 206 of the receptacle 192 is seated for locking the receptacle 192 to the collar mount 200. As illustrated, the opening to the depression 204 includes straight edges 216 space apart between arched or curved edges 218. As described above, the flange 206 on the receptacle 192 is geometrically configured to fit within the depression 204. More specifically, the flange 206 on the receptacle 192 also includes straight edges 220 spaced apart between arched edges 222. In order to lock the receptacle 192 to the collar mount 200, the straight edges 216 on the flange 206 of receptacle 192 are aligned with the straight edges 216 of the collar mount 200 so the flange 206 of receptacle fits in the depression 204. The receptacle 192 is then rotated so that the arched edges 222 on the receptacle flange 206 seated in the lip 214 at the straight edges 216 of the collar mount 200. A press may then be used to compress the straight edges 216 of the collar mount 200 against the receptacle flange 206, thereby locking the receptacle to the collar mount 200. In an embodiment, the collar mount 200 includes an aperture or notch 250 along one of the straight edges 216 on the collar mount 200. In addition, the receptacle flange 206 includes an aperture or notch 252 on one of the curved edges 222 on the receptacle 192. Once the receptacle flange 206 is inserted in the collar mount depression 204, the respective apertures or notches 250 and 252 are aligned with one another.

In this manner, a metal pressing tool (not shown) having a pin is used to compress the collar mount straight edges 216 against the curved edges 222 of the receptacle flange 206. The pin on the tool is inserted through the aligned apertures 250 and 252 to ensure the edges 222 of the receptacle flange 206 are properly aligned with the straight edges 216 on the collar mount 200 before compressing the collar mount edges 216 against the receptacle flange curved edges 222.

Figure 25A:
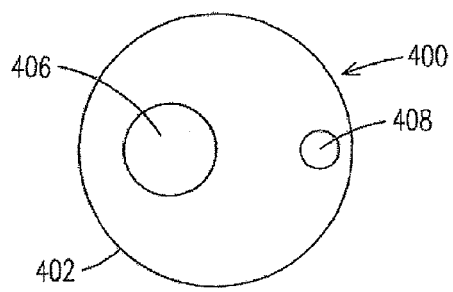
FIG. 25A is top view of a prior art cam washer.
Figure 25B:
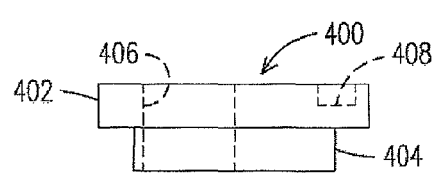
FIG. 25B is a side view of the prior art cam washer.
Figure 24A:
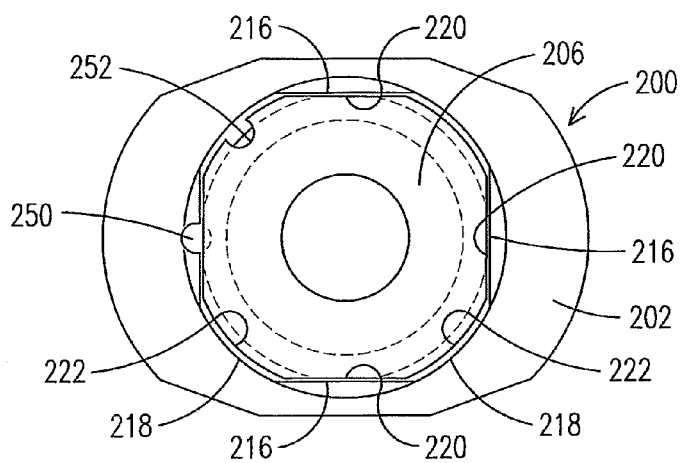
FIG. 24A is a view the collar mount having a receptacle inserted therein.
Figure 24B:
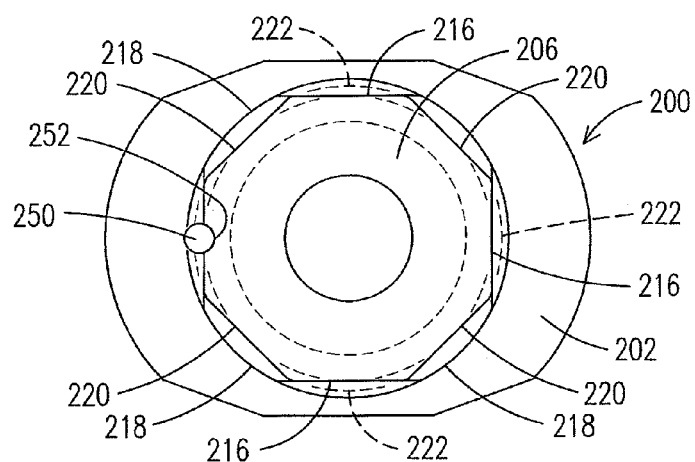
FIG. 24B is a view of the collar mount with the receptacle having been rotated to a locking position in the collar mount.

In another aspect of the invention, the components such as the cam washers may be used to properly align a cowling fastener relative to one or more panels to secure the panels together. A prior art cam washer 400 is shown in FIGS. 25A and 25B and includes a first disc 402 and second disc integrally machined as a single component. The first disc 402 has a diameter that is larger than the diameter of the second disc 404; however, both discs 402 and 404 are concentrically aligned. A hole 406 is provided for receiving a bolt, and the hole 406 is offset relative to a center of the first disc 402 and second disc 404.

These prior art cam washers 400 have been used with cowling fasteners of the prior art shown in FIG. 19, which include flanges to which the barrel 172 is attached. The flange includes holes that are aligned with holes on a panel. The cam washers 400 (not shown in FIG. 19) are provided with the second disc 404 being inserted in the hole on the flange of the fastener and hole 406 on the cam washer is aligned with a corresponding hole in the panel. A bolt is then inserted through the cam washer 400 and the hole on the panel. A nut and appropriate tools are used to secure the fastener to the panel. In the event, a second panel is placed against the fastener and the fastener is not aligned with a grommet hole on the second panel, the cam washers 400 can be rotated to align the fastener with the grommet hole of the other panel. As shown in FIG. 25A, the prior art cam washers include a small recess 408 disposed along a periphery of the first disc 402, and an appropriate tool is inserted in the recess 408 to rotate the cam washers 400. In as much is the bolt is offset the relative to a center of the cam washer 400, and the flange hole is slightly larger in diameter than the second disc 404, the rotation of the cam washer 400 causes the fastener to move in order to align the fastener with the grommet hole of the another panel. Once the fastener is so aligned, the bolt is tightened further to secure the fastener in place.

Figure 26A:
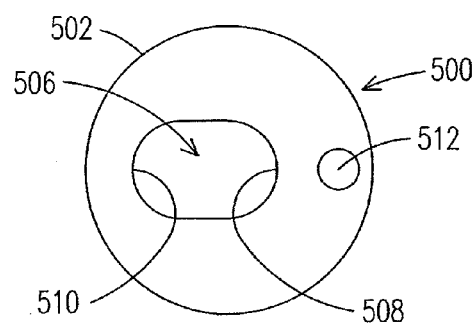
FIG. 26A is a top view of the inventive cam washer.
Figure 26B:
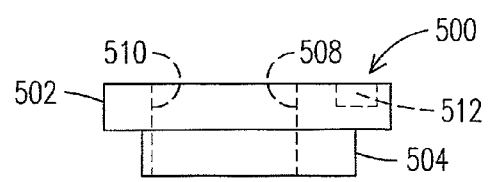
FIG. 26B is a side view of the inventive cam washer.

With respect to an embodiment of the invention shown in FIGS. 26A and 26B, the cam washer 500 is machined having two discs 502 and 504 integrally forming a unitary component. The first disc 502 has a diameter that is larger than the second disc 504, and both discs 502 and 504 are concentrically aligned with one another. As illustrated, the cam washer 500 includes an elongated or oval-shaped hole 506 that allows for movement of the cam washer 500 for aligning the fastener. The hole 506 includes a first curved edge 508 that aligns a bolt with the center of the cam washer 500. The hole 506 also includes a second curved edge 510 that at which a bolt may be positioned so the cam washer 500 may be rotated to move the fastener for alignment with a grommet hole of a panel. In such an embodiment, a bolt can be moved off the first edge 508 toward the second non-concentric edge 510 so the washer 500 cam provide a cam force against the flange in order to move the fastener in position. A bolt may be positioned at various points between the first edge 506 and second edge 510 to provide different levels of movement of the fastener, with the greatest level of movement being at the point when the bolt is positioned against the second edge 510 of the hole 506. As shown the cam washer includes a peripheral recess 512 for engagement with an appropriate tool to rotate the cam washer 500 and adjust the position of the cam washer 500.

In reference, to FIGS. 27, 28A, 28B and 28C, there is shown a sectional side view of a cowling fastener with cam washers 500 and top views of a fastener flange with the cam washers respectively. As shown the cowling fastener 520 includes a first receptacle 540 such as a rubber barrel mounted to a flange 524. The rubber barrel 540 includes a central opening 544 for alignment with a grommet hole of a second panel (not shown) to be secured to the fastener 520 and panel 522. A second receptacle 542 is mounted within the barrel 540 for receiving a stud (not shown) inserted through a grommet on a second panel as described above. The receptacle may include the above describe prior art receptacles, or receptacles having an adjustable insert according to the present invention or the collar mount and receptacle described above.

Figure 27:
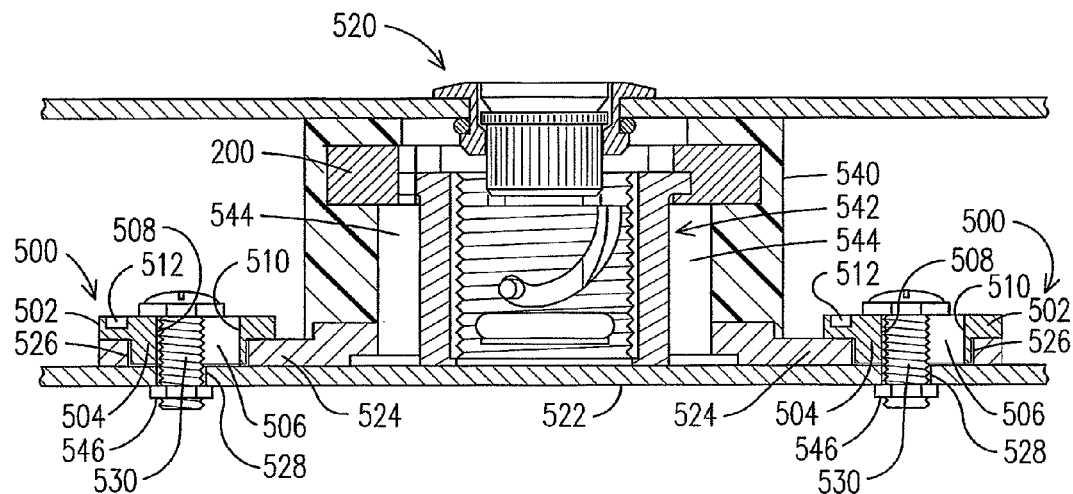
FIG. 27 is a side sectional view of a cowling fastener with the cam washers.
Figure 28A:
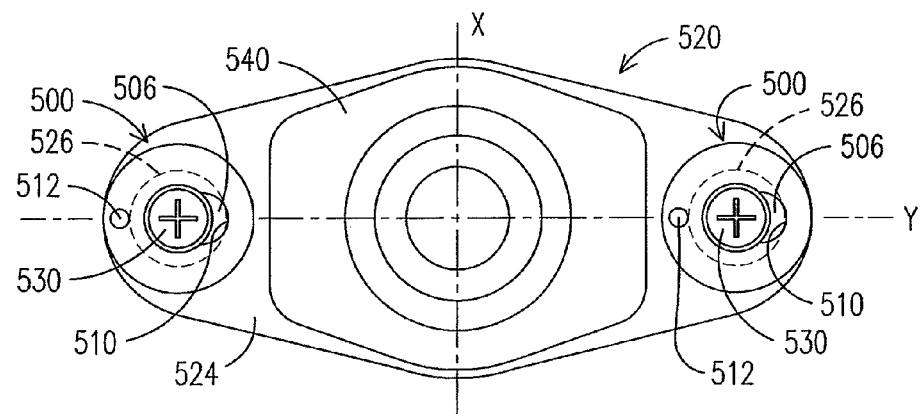
FIG. 28A is a top view of the cam washers on a fastener flange with the bolts centered on the cam washers.

The cowling fastener 520 may also include a flange 524 having holes 526 in which the cam washers 500 are seated. The flange holes 526 are aligned with holes 528 in the panel 522. A bolt 530 is inserted through the cam washer hole 506, flange hole 526 and panel hole 528. The bolt 530 may preferably be inserted through the cam washer hole 506 with the bolt 530 against the first edge 508 of the hole 506, so the bolt 530 is centered relative to the cam washer 500. In this manner, when the grommet hole for the second panel is positioned over the panel 522 and the grommet hole is properly aligned with the central opening 544 of the barrel 540 and the receptacle 542, no further alignment is necessary and the cowling fastener may be secured to panel 522 for installation of the second panel. As shown in FIGS. 27 and 28A, the bolts 530 are aligned with the concentric edges 508 of the holes 506. Accordingly, the non-concentric edges 510 of the holes 506 are shown. As shown in FIG. 28A, the center of the barrel 540 and receptacle 542 are aligned at an intersection of X-Y axis to represent the center of the fastener including the center of the barrel 172 and receptacle 192.

Figure 28B:
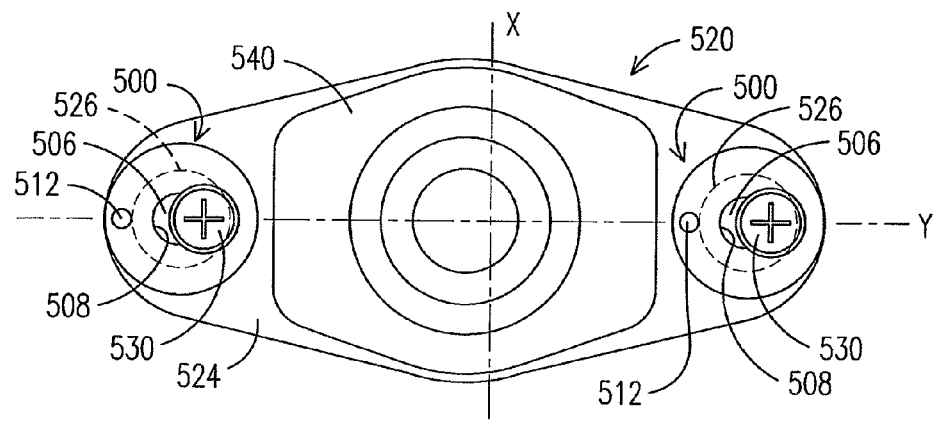
FIG. 28B is a top view of the fastener in FIG. 28A having been moved in preparation to adjust the cam washers and position of the fasteners.
Figure 28C:
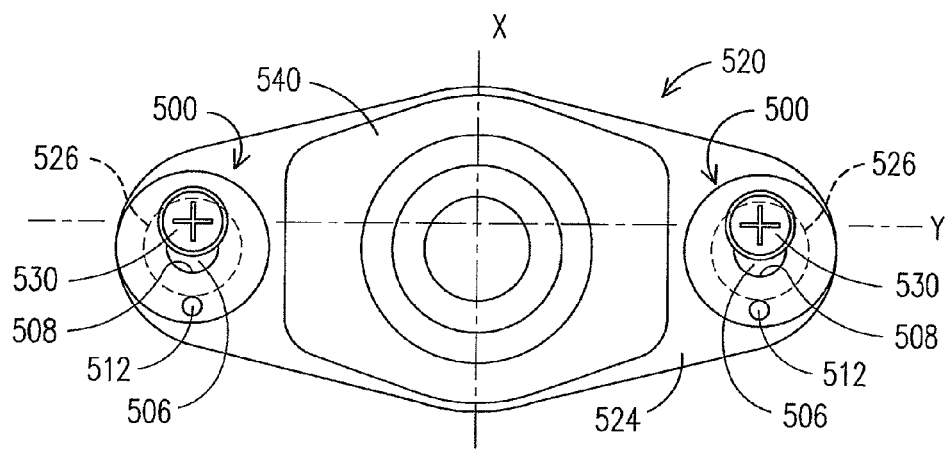
FIG. 28C is a top view of the fastener in 28B with the cam washers having been rotated 90° for alignment of the fastener.

However, in some instances the grommet hole of the second panel may not be aligned with the central opening 544 of the barrel 540 in which case the fastener will need to be re-positioned. Accordingly, the bolt 530 may be moved toward or to the concentric edge 510 of the cam washer hole 506 depending on the amount of repositioning of the fastener 520 required. As shown in FIG. 28B, the fastener 520 has been moved to the left relative to the X axis, so the bolts 530 are positioned at the non-concentric edges 510 of the holes 506. When the bolts 530 are repositioned in the hole 506, the bolt 530 is partially secured in place by a nut 546. With respect to FIG. 28C, the cam washers 500 have each been rotated 90° using an appropriate tool that engages the cam washers 500 at the recesses 512. As noted above, the second disc 504 of the cam washer 500 has a diameter slightly smaller than the diameter of the flange hole 526. Thus when, when the cam washers 500 are rotated, the second disc 504 provides a cam force against the flange 524, causing the fastener 520 and the barrel 540 to move on the panel 522. As shown in FIG. 28C, the cam washers 500 have been rotated 90° so the center of the barrel 540 and receptacle 542 are aligned with the X axis, but below the Y-axis. Once a proper alignment is determined the bolt 530 is tightened to secure the fastener 520 in position on the panel 522. Accordingly, the cam washers 500 with the oval shaped hole 506 having the first edge 508 concentrically aligned relative to the discs 502 and 504 provides an initial locator for the bolt 530 in the event the grommet hole and fastener are properly aligned, and no adjustment is necessary. In addition, if the fastener 520 position must be adjusted, the bolt 530 can be moved toward the non-concentric edge 510 to adjust the position of the fastener.

Having thus described the present invention and its preferred embodiments in detail, it will be readily apparent to those skilled in the art that further modifications to the invention may be made without departing from the spirit and scope of the invention as presently claimed.

What is claimed is:

1. A fastener for holding together first and second panels, wherein each panel has an aperture for receiving the fastener, a first side of each panel in engagement with the other of said panels, and a second side facing away from the other side of said panels, comprising:

a grommet having an opening and a radially outward extending flange for engaging the second side of said first panel;

a stud having opposite ends, a head at one of said ends, and a cross pin adjacent to the other of said ends, said stud being received in the opening of the grommet;

a receptacle to be secured to the second side of the second panel adjacent to the aperture on the second panel and having a cylindrical body extending away from the grommet and first panel;

an insert disposed within the receptacle having a first end facing the grommet and the insert is connected to the receptacle for movement relative to the receptacle, and the insert having a central opening and diametrically opposed cam and locking surfaces open to said central opening, wherein the stud extends into said central opening, and said cross pin being engageable with said cam and locking surfaces, and said cam and locking surfaces are defined in curved slots in the insert, each said slot having an open end extending through the first end of the insert facing the grommet;

a bore in the insert radially disposed relative to a longitudinal axis of the insert and the bore having an opening at the outer periphery of the insert facing the receptacle; and, an engagement member disposed within the bore and moveable therein laterally relative to the longitudinal axis of the insert toward and against the receptacle to fix the insert against movement relative to the receptacle, and the engagement member is moveable laterally relative to and toward the central opening of the insert to allow movement of the insert relative to the receptacle.

2. The fastener of claim 1, further comprising:
a slot in the insert having a first opening at the first end of the insert facing the grommet and a second opening at a second end of the insert facing away from the grommet and the slot further having a longitudinal axis parallel to a longitudinal axis of the insert;
a pin positioned within the slot and having a surface for contacting the engagement member and a notch; and,
wherein the pin is moveable to a position within the slot so the surface contacting and biasing the engagement member against the receptacle to fix the insert against movement relative to the receptacle and the pin is moveable to a position in which the notch is adjacent the engagement member allowing the engagement member to move laterally toward the central opening of the insert so the insert is moveable relative to the receptacle.

3. The fastener of claim 2, wherein the resilient member is an o-ring positioned at the second end of the insert and is biasing engagement with the pin.

4. The fastener of claim 2, wherein the resilient member is a torsion spring positioned at the second end of the insert and is biasing engagement with the pin.

5. The fastener of claim 2, wherein the insert includes a flange fixed thereto in spaced relation to the second end of the insert forming a groove between the flange and second end of the insert, and the resilient member is seated in the groove.

6. The fastener of claim 5, wherein the resilient member is an o-ring seated in the groove.

7. The fastener of claim 5, wherein the resilient member is a torsion spring seated in the groove.

8. The fastener of claim 2, wherein the pin is moveable in the slot relative to the insert in a direction parallel to the longitudinal axis of the slot and the insert, and the fastener further comprising:
a resilient member at the second end of the insert facing away from the grommet for biasing the pin toward the grommet and placing the pin in contact with the engagement member and forcing the engagement member against the cylindrical body of the receptacle for securing the insert from movement relative to the receptacle; and,
wherein the pin is moveable toward the biasing mechanism so the engagement member is disengaged from the cylindrical body of the receptacle to move the insert relative to the receptacle.

9. The fastener of claim 8, wherein the pin includes a first section and a second section and the first section has a diameter that is larger than the second section wherein the notch is at the second section and the first section contacts the engagement member moving the engagement member laterally relative to the longitudinal axis of the pin and against the receptacle when the biasing mechanism biases the pin toward the first end of the insert to secure the insert against movement of the insert relative to the receptacle, and the engagement member moves toward the pin when the pin is biased toward the second end of the insert wherein the smaller diameter of the second section of the pin enables the engagement member to move toward the pin to move the insert relative to the receptacle.

10. The fastener of claim 8, wherein the insert includes a flange affixed to and spaced from the second end of the insert and a groove is disposed between the flange and second end of the insert in which the biasing mechanism is seated.

11. The fastener of claim 2, wherein the first opening of the slot in which the pin is positioned is in communication with the central opening of the insert.

12. The fastener of claim 2, wherein the pin is rotatable in the slot to between the position at which the surface of the pin contacts the engagement member biasing the engagement member against the receptacle and the position at which the notch in the pin allows the engagement member to disengage from the receptacle.

13. The fastener of claim 1, wherein the receptacle comprises two diametrically opposed grooves on an internal surface therefore for receiving the engagement member and securing the insert from movement relative to the receptacle.

14. The fastener of claim 1, wherein cylindrical body of the receptacle comprises internal threads, and the outer periphery of the insert defines external threads, said internal threads and said external threads being in threaded engagement with one another so that the insert can move relative to the receptacle.

15. The fastener of claim 1, wherein the insert is positioned in the cylindrical body of said receptacle, and said cross pin has a length greater than the diameter of the central opening of said insert and less than a diameter of the cylindrical body of said receptacle.

16. A receptacle for a fastener for holding together first and second panels, wherein each panel has an aperture for receiving the fastener, a first side in engagement with the other of said panels, and a second side facing away from the other of said panels, the fastener includes a grommet having an opening and a radially outward extending flange for engaging the second side of said first panel, and the fastener further includes a stud having opposite ends, a head at one of the ends, and a cross pin adjacent to the other of the ends, the stud being received in the opening of the grommet, the receptacle comprising:
a cylindrical body secured to second side of the second panel and the cylindrical body having a central boring;
an insert positioned in the central boring of the cylindrical body defining an end facing the grommet and means for receiving the cross pin of the stud, and the insert is connected to the receptacle for movement relative to the cylindrical body;
a bore in the insert is orthogonally disposed relative to a longitudinal axis of the insert and the bore having an opening at the outer periphery of the insert facing the receptacle; and,
an engagement member disposed within the slot of the insert and moveable therein laterally relative to a longitudinal axis of the insert toward and against the receptacle to fix the insert against movement relative to the receptacle, and the engagement member is moveable laterally relative to and toward the longitudinal axis of the insert to allow movement of the insert relative to the receptacle.

17. The fastener of claim 16, further comprising:
a slot in the insert having a first opening at the first end of the insert facing the grommet and a second opening at a second end of the insert facing away from the grommet and the insert further having a longitudinal axis parallel to a longitudinal axis of the insert;
a pin positioned within the slot and having a surface for contacting the engagement member and a notch; and,
wherein the pin is moveable to a position within the slot so the surface contacting and biasing the engagement member against the receptacle to fix the insert against movement relative to the receptacle and the pin is moveable to a position in which the notch is adjacent the engagement member allowing the engagement member to move laterally toward the central opening of the insert so the insert is moveable relative to the receptacle.

18. The fastener of claim 17, wherein the pin is moveable in a direction parallel to the longitudinal axis of the slot and the insert, and the fastener further comprising:
a biasing mechanism at the second end of the insert facing away from the grommet for biasing the pin toward the grommet and placing a surface of the pin in contact with the engagement member and forcing the engagement member against the cylindrical body of the receptacle for securing the insert from movement relative to the receptacle; and,
wherein the pin is moveable toward the biasing mechanism so the notch receives the engagement member which disengages from the cylindrical body of the receptacle to move the insert relative to the receptacle.

19. The fastener of claim 18, wherein the pin includes a first section and a second section and the first section has a diameter that is larger than the second section wherein the notch is at the second section and the first section contacts the engagement member moving the engagement member laterally relative to the longitudinal axis of the pin and against the receptacle when the biasing mechanism biases the pin toward the first end of the insert to secure the insert against movement of the insert relative to the receptacle, and the engagement member moves laterally relative to the longitudinal axis of the pin and toward the pin when the pin is biased toward the second end of the insert wherein the smaller diameter of the second section of the pin enables the engagement member to move toward the pin to move the insert relative to the receptacle.

20. The fastener of claim 17, wherein the first opening of the slot in which the pin is positioned is in communication with the central opening of the insert.

21. The fastener of claim 20, wherein the insert includes a flange affixed to and spaced from the second end of the insert and a groove is disposed between the flange and second end of the insert in which the biasing mechanism is seated.

22. The fastener of claim 17, wherein the pin is rotatable in the slot between a position at which a surface of the pin biases the engagement member against the receptacle locking the insert against movement relative to the receptacle and a position at which the notch allows the engagement member to move laterally and disengages from the receptacle allowing movement of the insert relative to the receptacle.

23. The fastener of claim 16, wherein the receptacle comprises two diametrically opposed grooves on an internal surface therefore for receiving the engagement member and securing the insert from movement relative to the receptacle.

24. The fastener of claim 16, wherein the cylindrical body of the receptacle defines a cylindrical bore having internal threads, and the outer periphery of the insert defines external threads, said internal threads and said external threads being in threaded engagement with one another so that the insert can be moved relative to the receptacle.

25. The fastener of claim 16, wherein said cylindrical body of said receptacle defines a bore, said insert is positioned in said bore of said receptacle, and said cross pin has a length greater than the central opening of said insert and less than the bore of said cylindrical body.

* * * * *